United States Patent [19]

Boudeville

[11] 4,015,236
[45] Mar. 29, 1977

[54] DEVICE FOR CONTROLLING SAFETY SEAT BELTS

[75] Inventor: Jean-Claude Boudeville, Boulogne-Billancourt, France

[73] Assignee: Regie Nationale des Usines Renault, Hauts de Seine, France

[22] Filed: Jan. 14, 1976

[21] Appl. No.: 649,082

[30] Foreign Application Priority Data

Jan. 15, 1975 France .............................. 75.01077

[52] U.S. Cl. .............................. 340/52 E; 340/278; 307/10 SB; 180/82 C
[51] Int. Cl.$^2$ ......................................... B60R 21/10
[58] Field of Search ........................ 340/52 E, 278; 307/10 SB; 180/82 C

[56] References Cited
OTHER PUBLICATIONS
1,281,791  7/1972  United Kingdom ............ 340/52 E Primary Examiner—Alvin H. Waring
Attorney, Agent, or Firm—Fleit & Jacobson

[57] ABSTRACT

A device for checking and controlling the proper closing and locking of a safety belt of the seat of a vehicle, comprising a system for emitting electrical oscillations and at least one receiver, and reference electric switches for detecting the position of the belt and the presence of the occupant of the seat, and an alarm system.

The emitter system comprises a low-frequency (excluding radio frequency oscillations) oscillator located on the lap portion of the belt strapping, said receiver comprising a pair of coils located the one under the upholstery of the seat back and the other under the upholstery of the seat bottom, each coil being associated with an amplifier and with a double voltage comparator receiving in each comparator a predetermined reference voltage with which the voltages of the signals representing the highest voltage limit or the lowest voltage limit, which are received on the corresponding coil, are compared, as a function of the position of the oscillator of the emitter system, a logic system of a type known per se receiving the signals from said comparators and from the reference switches for transmitting said signals to said alarm system.

4 Claims, 4 Drawing Figures

DEVICE FOR CONTROLLING SAFETY SEAT BELTS

The present invention relates to a control device for preventing the occupant of a seat in a motor vehicle from locking the safety belt in an abnormal condition or position.

Hitherto known systems for controlling the closing of safety belts or harnesses compel the user to sit down and lock the belt, i.e. engaing the bolt member into the keeper in a manner causing the former to be releasably locked into the latter. However, this system does not compel the user to pass the belt around the front of his body. In fact, the passenger may as well sit down upon the belt or pass it round his back or even under the seat.

It is the primary object of this invention to provide a device capable of preventing the user, whether the driver or another occupant of the vehicle, from wrongly disposing his or her safety belt or harness.

This control device comprising an oscillator-type emitter and at least one receiver is characterised in that the emitter system comprises a low-frequency oscillator (i.e. of a nonradio frequency type) located in the lap portion of the belt strapping, the emitter system comprising on the other hand a pair of coils disposed the one under the upholstery of the back and the other under the upholstery of the seat, each coil being associated with an amplifier and a double voltage comparator receiving on each comparator a predetermined reference voltage with which the voltages of signals representing the highest or the lowest voltage limit which are received from the corresponding coil, are compared, as a function of the position of the oscillator of said emitter system, a logic system of known type receiving the signals from said comparators and reference switch means for actuating an alarm system in case of faulty locking of the safety belt.

Other features of this invention will appear as the following description proceeds with reference to the attached drawing illustrating diagrammatically, by way of example, a typical form of embodiment thereof. In the drawing.

Figure 1:
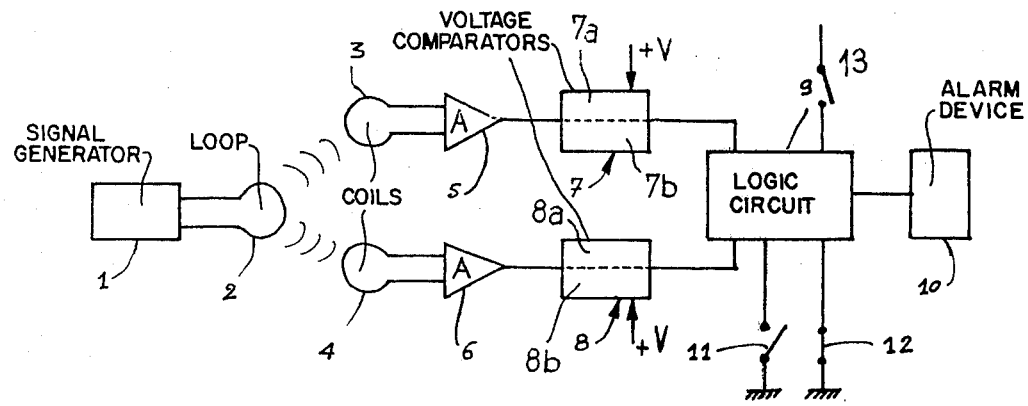
FIG. 1 is a block diagram illustrating a device according to this invention for equipping a seat.

Referring first to FIG. 1, it will be seen that the control system comprises a signal generator 1 adapted to emit through a conducting loop 2 connected to the lap portion of the safety belt electrical low-frequency oscillations excluding radioelectrical oscillations creating a field moderately absorbed by the human body and without any danger for the user. On the seat, a pair of receiving coils 3 and 4 advantageously consisting of flexible printed circuit plates are disposed the one under the upholstery of the seat back and the other under the upholstery of the seat bottom thereof. Thses coils are connected to a pair of amplifiers 5 and 6 connected in turn to double voltage comparators 7 and 8 having their outputs connected to a logic circuit 9 adapted to actuate or energize the light and/or sound alarm device 10, or any other suitable safety or alarm means, in case the belt were not properly locked and passed around the user's body. This system operates in conjunction with a switch 11 disposed under the seat bottom and capable of detecting the presence of the passenger or driver by closing a circuit, and with another switch 12 disposed within the keeper of the belt, for opening this circuit when the belt bolt is properly inserted therein. The checking steps takes place when the driver turns on the general or main ignition switch 13 (or releases the hand brake or shifts a gear).

Figure 2:
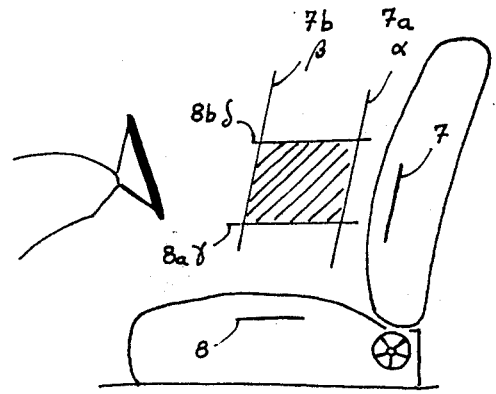
FIG. 2 illustrates the position of the emitter loop in relation to the seat under normal operating conditions.
Figure 3:
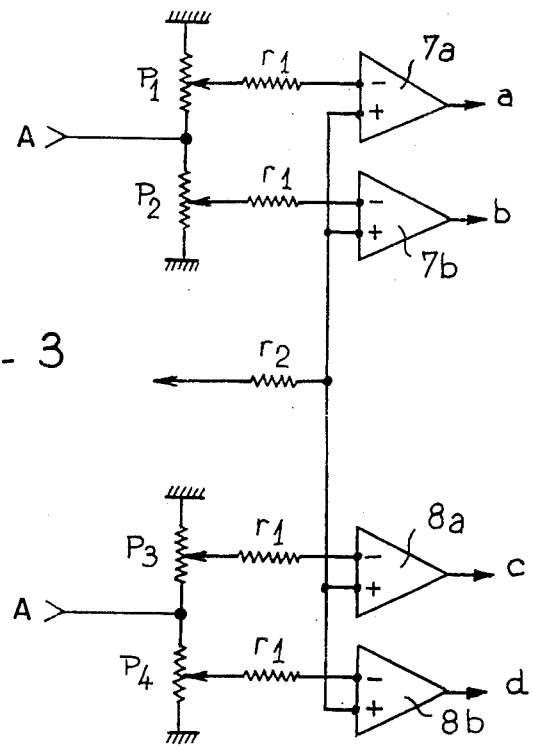
FIG. 3 illustrates a typical diagram of the comparators.

When locking the belt in a normal position, the lap portion of the safety belt is positioned in the hatched area of FIG. 2. Each double voltage comparator 7, 8 comprises, as illustrated in FIG. 2, two comparators $7a$, $7b$ and $8a$, $8b$. Comparators $7a$, $7b$ are associated with the seat back and comparators $8a$, $8b$ are associated with the seat bottom. Comparators $7a$, $8a$ are adapted to detect the voltage emitted at the front limit, designated by the symbols $\alpha$, $\gamma$ respectively, of the position of the emitter loop 2, and comparators $7b$, $8b$ detect the voltage emitted at the rear limit, designated by the symbols $\beta$, $\delta$ respectively, of the emitter loop. The lines $\alpha$, $\beta$, $\gamma$, $\delta$ denote the four sides of the area to be normally occupied by the emitter loop. The signals delivered by amplifiers 5 and 6 are received, as illustrated in FIG. 3 by comparators $7a$, $7b$ and $8a$, $8b$ via voltage dividers comprising each a pair of adjustable potentiometers $P_1$ and a resistor $r_1$. Moreover, each comparator receives via a resistance $r_2$ a reference voltage $+V$ with which the voltages of the incoming signals are compared.

Figure 4:
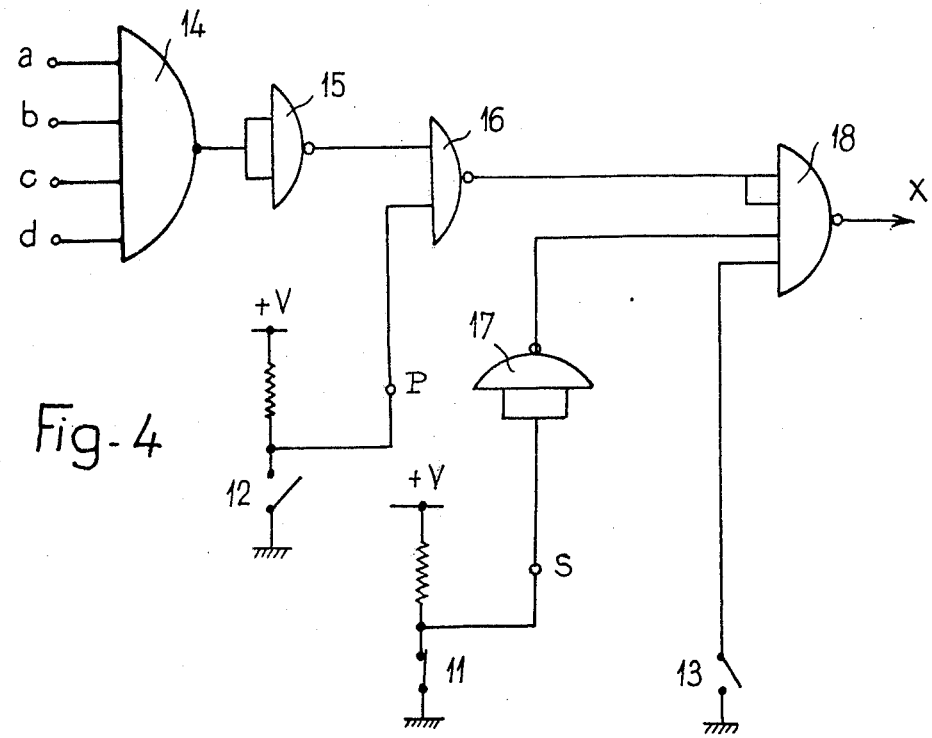
FIG. 4 shows the wiring diagram of the logic circuit.

The logic circuit 9 illustrated diagrammatically in FIG. 4 is a conventional N-AND gate circuit 14 to 18 receiving successively the signals $a$, $b$, $c$ and $d$ from the comparators and the signals P and S from switches 11 and 12.

The logic circuit 9 decides whether the belt is properly locked or not through the following process:

The comparators $7a$, $7b$ and $8a$, $8b$ are set to cause the value of their output voltage to change abruptly when the emitter loop 2 associated with the safety belt intersects the lines $\alpha$, $\beta$, $\gamma$ and $\delta$. Let us assume firstly that the safety belt is unlocked and stowed in its winder or suspended from its support. In this case, the four comparators are inoperative and it may be said that they are in their zero state. If the seat is occupied and switch 11 closed, switch 12 being open and the belt not properly locked, the alarm device will be actuated or energized. Now if the belt is properly locked, the state of both comparators $7a$ and $8a$ will be changed to what may be called "state one". Therefore, we have in this case: $7a = 1$ and $8a = 1$ and $7b = 0$ and $8b = 0$. This is the logic requirement to be met for properly locking the belt. In this case no alarm will operate. In all the other configurations, an alarm will operate, provided that the switch 11 associated with the seat bottom be closed (due to the presence of an occupant) and switch 12 be open (engagement of the bolt into the keeper). If in a same vehicle one passenger fails from properly locking his belt while sitting on a seat and the driver turns on the switch 13, an alarm device will be operated or energized. In other words, from the moment somebody is sitting on a seat equipped with the device of this invention, he must properly lock his safety belt, otherwise an alarm device will be actuated in proper time.

With this invention, it is possible to check whether all the seat belts of a vehicle having $n$ seats equipped with such belts ($n$ being any number) are properly locked. In this case, a scanning circuit is used for checking in succession all the seats equipped with the device of this invention. This operation will take place cyclically by causing the generator 1 to emit low-frequency signals as necessary for each checking step, until all the occupants of the vehicle have properly closed their safety balts. It is only when this requirement has been fully met that all the alarms device become inoperative. Then, unlocking or releasing a bolt from its keeper will energize an alarm device and start another checking or control cycle which will last as long as the belt concerned has not been properly re-locked. Therefore, the device according to the present invention may advantageously be associated with a central electronic control device mounted either on private vehicles or on public transport vehicles.

In certain case it is also advantageous and possible to utilize the receiving coils 3 and 4 for heating the seats.

Although a specific form of embodiment of this invention has been described hereinabove and illustrated in the accompanying drawing, it will readily occur to those conversant with the art that various modifications and changes may be brought thereto without departing from the scope of the invention as set forth in the appended claims.

What is claimed as new is:

1. A device for checking and controlling the proper closing and locking of a safety belt of the seat of a vehicle, which comprises an emitter system for emitting electrical oscillations and at least one receiver, position sensing switches for detecting the closure of the belt and the presence of an occupant on the seat, and an alarm system, wherein said emitter system comprises a low-frequency non-radio frequency electromagnetic oscillator, said oscillator being located on the lap portion of the belt strap, said receiver comprises two identical receiving circuits disposed in parallel, each of said two identical receiving circuits includes the series connection of a receiving coil, an amplifier and a double voltage comparator receiving in each comparator a predetermined reference voltage whereby the voltages of the signals representing the highest voltage limit or the lowest voltage limit received on the corresponding coil, are compared, as a function of the position of the oscillator in the emitter system, wherein said coils are located the one under the upholstery of the seat back and the other under the upholstery of the seat bottom respectively, a logic system connected to the outputs of said comparators and to said position sensing switches and said alarm system being connected at the output of said logic system.

2. Device according to claim 1, wherein each coil of the receiver system consists of a flexible printed circuit plate.

3. Device according to claim 1, wherein said coils are heating the seat.

4. Device according to claim 1, further comprising an associated cyclic control means for scanning a plurality of seats.

* * * * *